Nov. 29, 1932.  L. M. PERSONS  1,889,613
ELECTRIC DRAFT CONTROLLER
Filed Dec. 5, 1927   2 Sheets-Sheet 1
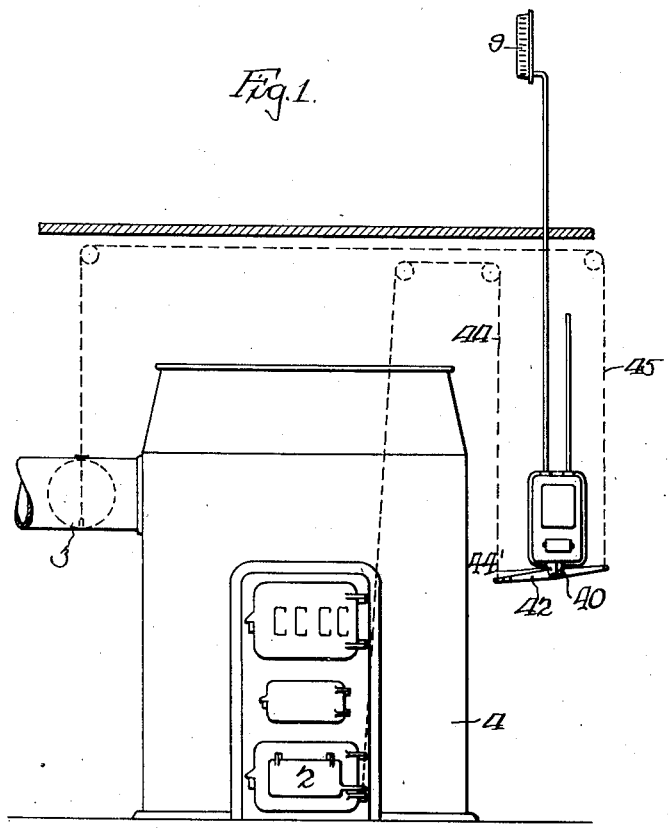
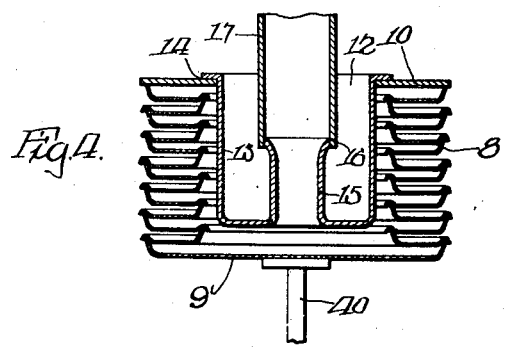
Inventor:
Lawrence M. Persons Nov. 29, 1932.　　　L. M. PERSONS　　　1,889,613
ELECTRIC DRAFT CONTROLLER
Filed Dec. 5, 1927　　2 Sheets-Sheet 2
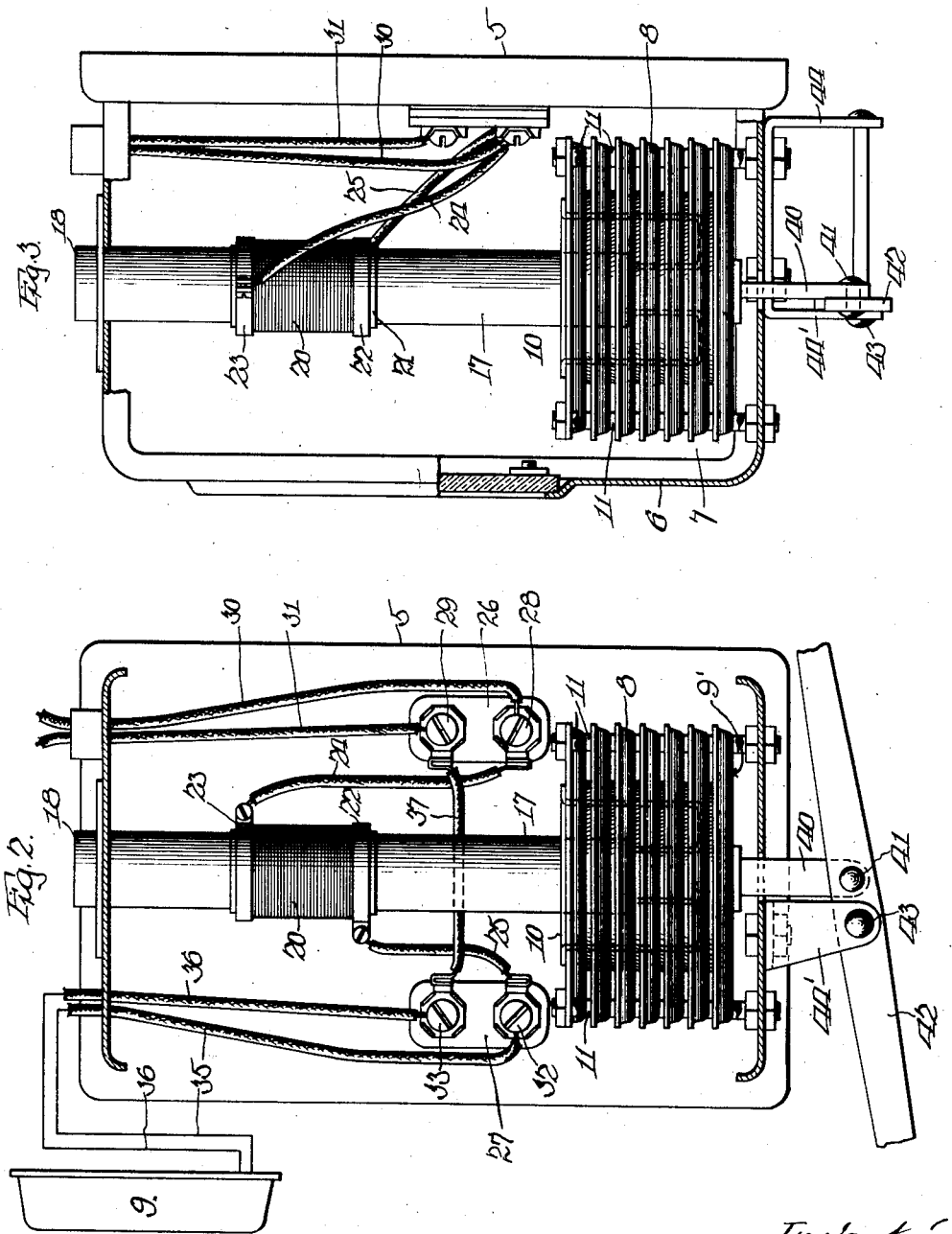

Patented Nov. 29, 1932

1,889,613

UNITED STATES PATENT OFFICE

LAWRENCE M. PERSONS, OF CHICAGO, ILLINOIS, ASSIGNOR TO COOK ELECTRIC COMPANY, OF CHICAGO, ILLINOIS, A CORPORATION OF ILLINOIS

ELECTRIC DRAFT CONTROLLER

Application filed December 5, 1927. Serial No. 237,626.

My invention relates to a type of heat regulator known as an electric draft controller. Devices of this type have heretofore been unsatisfactory and unreliable. A thermally controlled element in the form of an expansible and contractible vessel is generally provided with a heat coil in circuit with a temperature controlled room thermostat. The volatile substance in the expansible and contractible vessel is allowed to expand and then cool, this action being continuous as long as the room thermostat is closed. However, cooling the volatile substance, so as to prevent its continued expansion from bursting the expansible and contractible vessel, after a predetermined expansion of the latter has taken place, has been accomplished by a circuit breaker actuated by the vessel during its movement, so that the flow of current through the heat coil is temporarily interrupted. Dissipation of the heat from the walls of the vessel, after the circuit is interrupted, is slow and consequently, the vessel slowly contracts. In practice, this movement is found to be so slow that considerable difficulty with the action of the switch is experienced. Also, the expansion movement of the vessel is slow and the switch is permitted to break under a very slow movement. If a quick make and break switch is provided, it is still difficult to obtain the proper setting of the thermally controlled element so as to open and close the switch at proper times. Different conditions of service, as well as manufacturing inaccuracies enter into the problem of securing the necessary timed movements of the thermally controlled element in order that it may operate accurately and satisfactorily.

An object of the invention is to provide a draft controller of the electrically operated type provided with a thermally controlled element having a heat coil so arranged that the heat developed by the current flow serves to actuate and maintain the expansible and contractible vessel at a predetermined limit of expansion until the circuit is opened by the room thermostat.

Broadly, the invention is directed to a structure capable of eliminating the difficulties heretofore experienced by limiting the expansion of the element without temporarily interrupting the current flow through the heat coil.

In order to apprise those skilled in the art how to construct and practice my invention, I shall now describe a preferred embodiment thereof in connection with the accompanying drawings which form a part hereof.

In the drawings:

Figure 1 is a view illustrating the front portion of a furnace or heater with a structure embodying my invention applied thereto;

Fig. 2 is a vertical sectional view of the structure;

Fig. 3 is a side vertical sectional view of the structure; and

Fig. 4 is a sectional detail view of a portion of the thermally operated element.

The structure shown herein as comprising the electric draft controller embodying my invention may be applied to various types of heaters or furnaces having the usual inlet or draft damper 2 and check damper 3. In the drawings I have illustrated a portion of the furnace, being designated 4, but it will be understood that in so far as the disclosure of my invention is concerned, this illustration is merely conventional, inasmuch as the invention is capable of wide adaptation in this field.

The electric draft controller comprises a wall plate or mounting 5, the cover casing 6, and a thermally operated element 7 within casing 6, including a heat coil 20 in circuit with a room thermostat 9. Thermally operated element 7 may assume any desirable form, but as illustrated, it comprises an expansible and contractible vessel 8 having a movable end wall 9' and a stationary wall 10 forming an end plate held rigidly within casing 6 by spaced vertical volts 11. Expansible and contractible vessel 8 may comprise the usual bellows containing a volatile fluid or substance adapted to expand under heat. Plate 10 is provided with a central aperture 12 for receiving an annular cup 13, which is hermetically sealed at 14 to plate 10, and which extends inwardly and downwardly into bellows 8. This cup 13 is of a considerable depth and is adapted to have a narrow hollow neck 15 formed therein. A fluid-tight seal is provided at the point 16 between neck 15 and a vertical tube 17. Tube 17 is closed off at its upper end, as illustrated at 18, but is adapted to be in communication with the interior of bellows 8 through the hollow neck 15.

Heating element 20, which is in the form of an electric resistance coil, suitably surrounds tube 17. This coil is, of course, electrically insulated from tube 17, but is in close proximity thereto in order transversely to conduct the heat developed by the current flow through the coil. Tube 17 and neck 15 are preferably of different materials. Heat is conducted transversely through the tube to the volatile fluid to cause it to expand and be driven through the neck into bellows 8. The conduction of heat to bellows 8 is, however, checked by means of neck 15 which may be of a smaller cross sectional area and of material of lower heat conductivity. Of the different kinds of materials that may be used, I desire to mention that the tube 17 may be of brass, while the neck 15 may be of steel. The brass, being of higher conductivity, will permit the heat to expand the volatile fluid as long as it is within this tube, but further conduction of heat is checked at the point 16 where the steel neck is secured to lower end of tube 17. Also, I find that the heat has a tendency to be conducted transversely and not longitudinally along the tube. After the volatile fluid is driven in the bellows, I find that further expanding action of the bellows is substantially checked. This is due to three reasons; first, the neck is of a different material than the tube 17, and consequently, the heat is not conducted as rapidly, second the cross sectional area of the neck is substantially smaller than that of the tube, and third, the heat has a tendency to be conducted transversely and not longitudinally along the tube. Moreover, experiments, which I have conducted, have shown that the conduction of heat may be checked to a satisfactory degree at the point 16 when the neck is of a smaller cross sectional area only and when the material is of the same or different heat conductivity. On the other hand, I find that the same result can be accomplished when the cross sectional area of the neck is disregarded and the material is of a predetermined heat conductivity, preferably lower of course and sufficient to prevent the heat from traveling to the bellows.

A sheet of insulation 21 may be wrapped about tube 17 at a point where heat coil 20 is mounted. Terminal bands 22 and 23 secure the ends of heat coil 20 to the leads 24 and 25. Two terminal blocks 26 and 27 are secured within the casing and mounting block 5. Terminals 28 and 29 are carried by block 26 for receiving leads 30 and 31 from the line. Lead 24 connects between terminal 28 and the terminal band 23, while lead 25 connects between the terminal band 22 and the lower terminal 32 on block 27, this lower terminal, together with an upper terminal 33, receiving the wires 35 and 36 of the room thermostat 9.

By referring to Fig. 2, the circuit may be traced as follows: current will flow over the live wire 30 to terminal 28, lead 24 through heat coil 20, lead 25 to terminal 32, from terminal 32 through lead 35, the room thermostat 9, through lead 36 to upper terminal 33 and by means of a lead 37 to the terminal 29, and from there to the other side of the line 31.

Lower wall 9' of the contractible and expansible vessel or bellows 8 is movable and carries a depending lug 40 adapted to be pivotally mounted at 41 to a rock lever 42. Rock lever 42 is fulcrumed at 43 to a bracket 44' secured to the underside of casing 6. Flexible connections 44 and 45 extend from opposite ends of rock lever 42 to the draft damper 2 and check damper 3, respectively.

It is obvious from the foregoing description that if the temperature of the room drops to a predetermined point, room thermostat 9 will close its circuit and cause the current to flow through heat coil 20. The heat developed by the flow of current through heat coil 20 will expand the volatile substance in tube 17 and drive it downwardly into the contractible and expansible vessel or bellows 8. Such expanding action of the volatile fluid will, in consequence, cause the bellows 8 to expand, moving its lower end wall downwardly whereby to rock the lever 42 and operate the draft and check dampers 2 and 3. By virtue of the novel mounting of the tube 17 carrying the heat coil 20, the volatile fluid will be permitted to expand and to be driven into the bellows 8. Further expansion of the fluid will be prevented due to the fact that continued conduction of heat to this volatile substance after it is driven into the bellows is prevented. That is to say, heat sufficient to affect the volatile substance will not be conducted past the neck 15 connecting tube 17 to the bellows 8. It is quite obvious, therefore, that bellows 8 will have a predetermined limit of expansion, irrespective of the continued flow of current through heat coil 20. If there is any tendency for the heat to be dissipated through the walls of bellows 8, the heat developed at the coil will replenish this lost heat and thereby hold the bellows at this predetermined limit of expansion.

From the foregoing description, it is obvious that I have provided an improved form of electric draft controller of the type embodying a thermally controlled element, the structure disclosed eliminating the need of a circuit breaker for intermittently opening and closing the thermostatic circuit until the room has reached the desired temperature. By holding the bellows at its predetermined limit of expansion during the period the room thermostat remains closed and the current continues to flow through the heat coil, the draft and check dampers 2 and 3 are not moved from their adjusted position, such as they would be if the bellows 8 were allowed to actuate a switch and thereby prevent excessive heat from expanding the fluid to a point of bursting the bellows.

Without further elaboration, the foregoing will so fully explain the gist of my invention, that others may, by applying current knowledge, readily adopt the same for use under varying conditions of service, without eliminating certain features, which may properly be said to constitute the essential items of novelty involved, which items are intended to be defined and secured to me by the following claims.

I claim:

1. In a heater having an inlet damper and a check damper, the combination with means responsive to temperature variations, of an electrically operated draft controller for said dampers and in circuit with and adapted to be controlled by said temperature responsive means including an expansible and contractible vessel and a heat coil which are relatively arranged whereby the heat developed by the current flow in said heat coil serves to actuate and continuously maintain said vessel at a predetermined limit of expansion until the circuit is broken by said temperature responsive means.

2. The combination with a heater having an inlet damper and a check damper, of an electrically operated draft controller for actuating said dampers comprising a thermally controlled element, a heat coil, and means associating said heat coil with said thermally controlled element whereby the heat developed by the current flow in said heat coil will actuate and continuously maintain said thermally controlled element at a predetermined limit of expansion.

3. In a heater having a draft damper and a check damper, the combination with means responsive to temperature variations, of an electrically operated draft controller in circuit with and adapted to be controlled by said temperature responsive means including a vessel for containing an expansible and contractible fluid, a heat coil, and means for preventing continued conduction of heat developed by a continuous flow of current in said heat coil from further expanding said fluid in said vessel after it reaches a predetermined limit of expansion, a lever actuated by the contraction and expansion of said vessel, and connections from said lever to said draft damper and to said check damper.

4. An electric draft controller comprising an expansible and contractible liquid containing member, a heat coil to vary the temperature of the liquid, means for mounting said heat coil relative to said member whereby the latter may have a predetermined limit of expansion and when so expanded to remain expanded irrespective of a continued current flow in said heat coil, a lever actuated by the movement of said member, and a thermostatic controller in circuit with said heat coil.

5. An electrical control comprising, in combination, a plurality of dampers, an expansible and collapsible member, a heat coil, a thermostat in circuit with said heat coil, means for associating said heat coil with said expansible and collapsible member whereby the latter may have a predetermined limit of expansion irrespective of a continued flow of current in said heat coil, and operatively connected means between said dampers and said member for imparting a predetermined movement to said dampers when said member expands.

6. In combination, a heater having dampers, a thermal element operatively connected to said dampers and including a heating coil and a source of current, and a temperature responsive device in circuit with said coil and source of current and adapted to continuously maintain said coil energized and said thermal element at a predetermined limit of expansion until disrupted by a rise in temperature over a predetermined degree.

7. In combination, a heater having dampers, an electrical circuit including a temperature responsive controller and a heating coil, and a thermal element operatively controlled by said heating coil and connected to operate said dampers upon expansion and contraction, said temperature responsive controller acting to continuously maintain the coil energized and the thermal element at a predetermined limit of expansion until said switch is opened by a rise in temperature above a predetermined degree.

In witness whereof, I have hereunto subscribed my name.

LAWRENCE M. PERSONS.